Dec. 15, 1931.  E. R. SLAGLE  1,837,139
MECHANICAL BRAKE FOR MOTOR VEHICLES
Filed Feb. 27, 1928   2 Sheets-Sheet 1
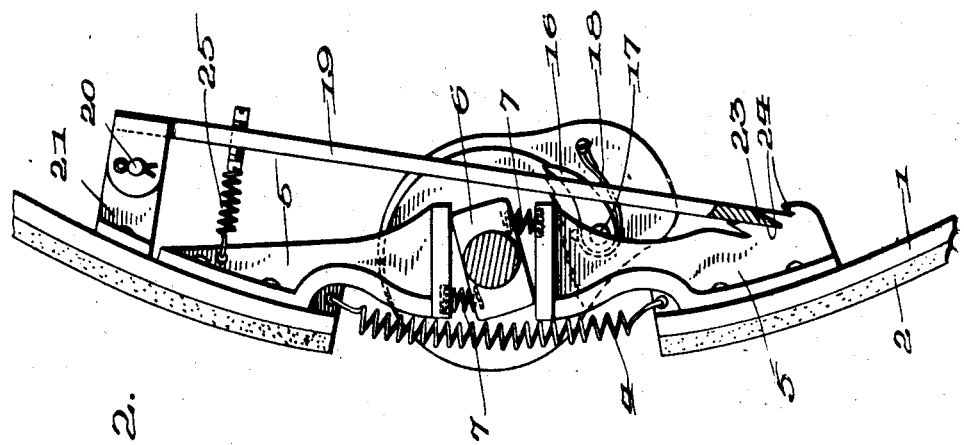
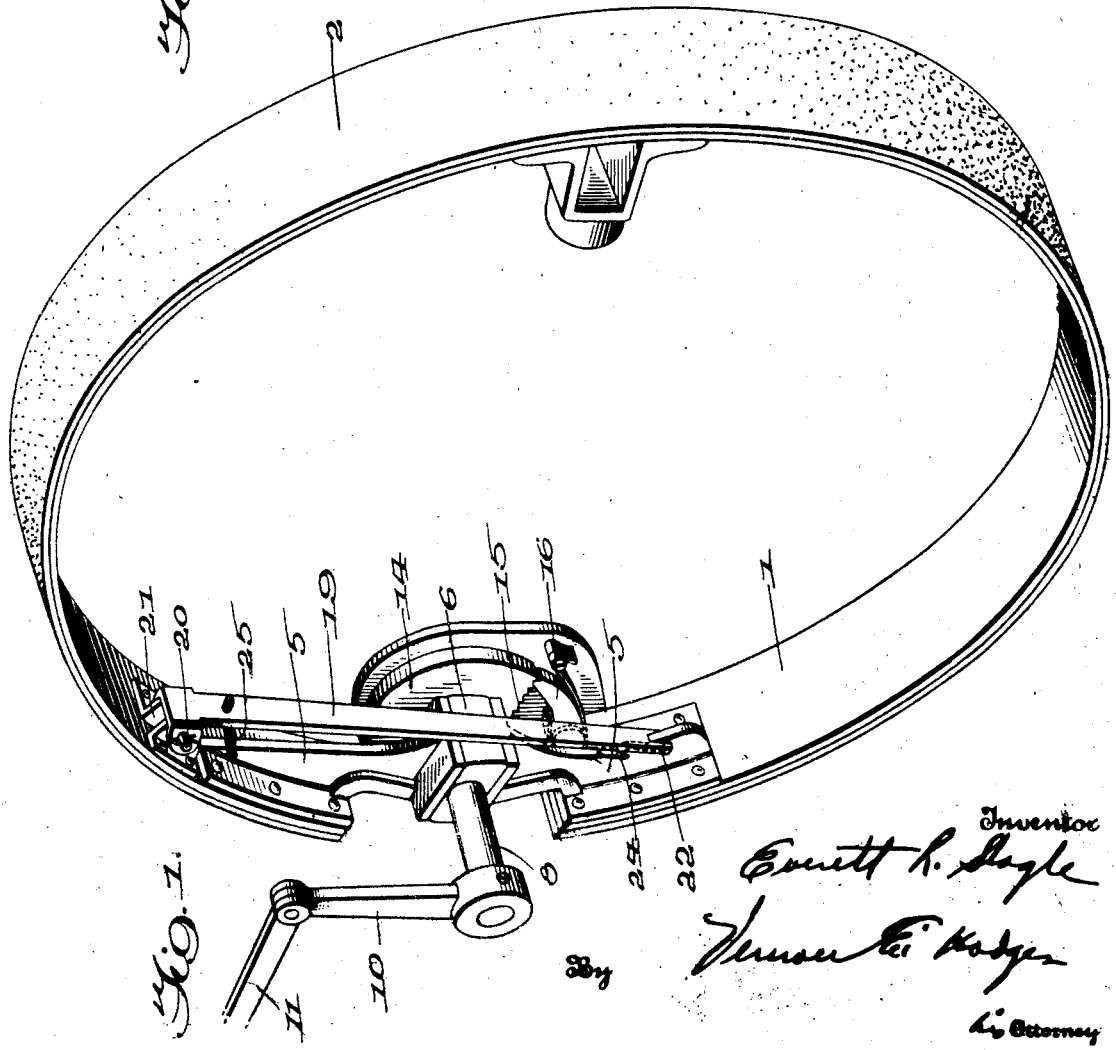

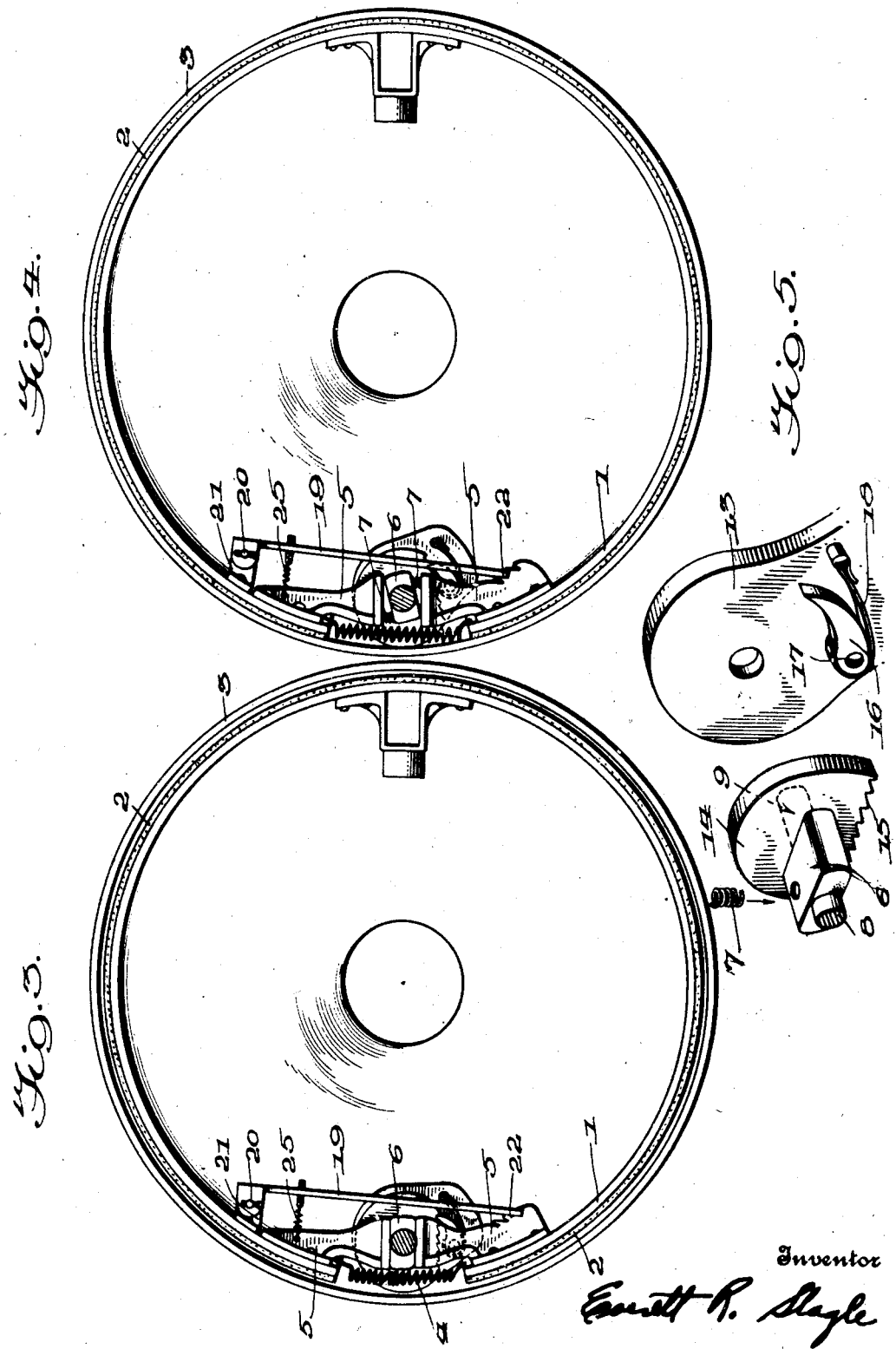

Patented Dec. 15, 1931

1,837,139

UNITED STATES PATENT OFFICE

EVERETT R. SLAGLE, OF SAYRE, PENNSYLVANIA, ASSIGNOR TO STANDARD VACUUM BRAKE COMPANY, OF CAMDEN, NEW JERSEY, A CORPORATION OF NEW JERSEY

MECHANICAL BRAKE FOR MOTOR VEHICLES

Application filed February 27, 1928. Serial No. 257,408.

This invention relates to an improvement in mechanical brakes for motor vehicles.

The object of the invention is to provide for automatically compensating for the wear which may take place between the braking members so that when the usual brake lining becomes worn to a considerable extent the brake band will be automatically adjusted to take up for this wear, so that it will not be necessary to move the band to a substantial extent in order to apply the brakes.

The invention is applied to the operating means for the brake band, which causes an expansion or contraction of the latter, accordingly as to which type of brake it may be applied, and is simple in construction and yet absolutely positive and automatic in operation. The invention may be applied either to mechanical brakes or to other types such, for instance, as vacuum, hydraulic or air brakes.

In the accompanying drawings:—

Fig. 1 is a perspective view of a brake band, showing the invention applied thereto;

Fig. 2 is an enlarged side elevation partly in section of the operating mechanism for the band;

Fig. 3 is a side elevation of the brake band contracted;

Fig. 4 is a similar view showing the band expanded; and

Fig. 5 is a disassembled detailed perspective view of the operating cam and its associate mechanism.

The invention is shown as applied to the expanding brake band of a type commonly in use on motor vehicles and the band of which is designated by the numeral 1, being provided with the usual brake lining 2 secured thereto in position to be moved into frictional engagement with the brake drum 3 for causing the braking action.

The opposite ends of the brake band 1 are slightly spaced apart but are connected together by the usual spring 4, and they also have the usual lugs 5 secured thereto and extending inwardly toward each other. An operating cam 6 is interposed between the inner faces of the lugs 5 for acting on the lugs to expand the brake band. Springs 7 are interposed between the opposite edges of the cam 6 and the inner faces of the lugs 5 and normally tend to hold the cam in an operating position, or in other words to turn the cam relative to and in contact with the lugs, while the spring 4 normally tends to cause a contracting of the brake band to release the application of the brakes whenever force is released from the cam 6. This cam 6 has trunnions 8 and 9 extending outwardly in opposite directions from the ends thereof, the trunnion 8 being connected by an arm 10 to the usual brake rod 11, which extends to the operating means for the brakes, which may apply a source of power thereto, which operating means may be mechanical, vacuum or other type. The trunnion 9 extends into and is rotatably mounted in a fixed plate 13. A disk 14 is fixed to the end of the cam 6 and may be formed as a part thereof, said disk being provided with ratchet teeth 15 on an edge thereof in position to be engaged by a pawl 16 pivoted as at 17 to the fixed plate 13 and normally pressed into engagement with the teeth 15 by a spring 18.

A pawl 19 is pivoted as at 20 to a bracket 21 carried by the brake band 1, as shown particularly in Fig. 2, and said pawl has a forked outer end 22 within which is formed a wedge 23 adapted to fit into the teeth 24 carried by one of the brackets 5 or by the brake band 1. This wedge 23 is normally held in engagement with the teeth 24 by a spring 25, which is connected with the pawl 19 and acts thereon.

In the operation of this brake, the braking action is applied to the usual brake rod 11, either by the ordinary foot pedal or other source of braking power for rotating the trunnions 8 and 9 and the cam 6 about their common axis, which causes an expanding force to be applied between the inner ends of the lugs 5, forcing these apart and expanding the brake band 1 which moves the lining 2 into frictional engagement with the brake drum, causing a braking action between these parts. As the cam 6 is turned about this axis, it causes a turning movement of the disk 14 relative to the plate 13 and when the initial movement of the brake band to move the lining into engagement with the brake drum is as great as the pitch of the ratchet teeth 15 on the disk, it will cause the pawl 16 to drop into engagement with another one of the teeth so as to automatically take up this slack. Because of the formation of the teeth the pawl will move back to the base thereof, which will allow a sufficient contraction of the brake band to release the frictional engagement with the brake drum but to take up the slack to a substantial extent between these parts.

The pawl 10 acts in a similar manner for likewise holding the ends of the brake band apart, this pawl serving as a brace between the ends. The spring 25 normally tends to hold the pawl in engagement with the ratchet teeth 24 and the yoke 22 straddles the ratchet teeth so that upon expanding of the brake band the yoke follows along the ratchet teeth until the expanding action is sufficiently great to cause the wedge 23 to drop between the next succeeding teeth and, when the braking action is released, this wedge remains between these teeth and holds the ends of the brake band partially expanded so as to take up the slack which may exist between the brake lining and the brake drum, as caused for instance by the wearing of the brake lining This provides a novel but effective manner of compensating for the wear of the lining without requiring that the brakes be tightened from time to time as is usually necessary to take up for this wear. This is accomplished automatically and it also insures of a sufficiently close relationship between the brake band and the brake drum to cause a positive braking engagement upon a proper movement of the brake band.

I claim:

1. The combination of a frictional member having disconnected ends, actuating means for said frictional member, and a pawl interposed between the free ends for limiting relative movement thereof in at least one direction.

2. The combination with an expansible brake band having the ends thereof spaced apart, actuating means for said band connected with the ends and a pawl interposed between approximately the opposite ends for limiting the relative movement of the ends in one direction and for automatically compensating for the wear of the band.

3. The combination with an expansible brake band, having operating means connected with the free ends thereof for causing an expanding action of the band, ratchet teeth carried by one of the ends, and a spring pressed pawl carried by the adjacent end in position to engage the ratchet teeth and limit the relative movement of the ends in one direction for automatically compensating for the wear of the band.

4. The combination with a brake band having disconnected ends, actuating means for said band, a rack having ratchet teeth fixed to one of said ends, and a pawl pivotally attached to the other end and in position to engage the teeth for automatically adjusting the brake band.

5. The combination with a brake band having disconnected ends, actuating means for said band, a rack having ratchet teeth fixed to one of said ends, and a pawl pivotally attached to the other end and in position to engage the teeth for automatically adjusting the brake band, said pawl having a yoke at its inner end straddling the ratchet teeth.

6. The combination of a brake band having opposed means connected therewith for applying said band, a cam interposed between said opposed means for actuating the same, and resilient means interposed between the cam and opposed means eccentrically of the axis of said cam.

7. The combination with a brake band having opposed lugs connected therewith for expanding said band, a cam interposed between said lugs for rotary movement to apply the band, and springs interposed between the opposite sides of the cam and the lugs, and eccentrically of the axis of rotation of said cam for normally holding the cam in operative engagement with the lugs.

8. The combination of a brake band, a cam for applying said band, operating means connected with one end of the cam for applying the same, a plate arranged at the opposite end of the cam, ratchet teeth carried by the cam, and a spring pressed pawl carried by the plate for engaging the ratchet teeth.

9. The combination of a brake band, a cam for applying said band, trunnions connected with opposite ends of said cam, operating means connected with one of the trunnions, a fixed plate arranged at the opposite end of the cam and supporting the opposite trunnion, ratchet teeth carried by the cam between said cam and the plate, and a spring pressed pawl carried by the plate for engaging the ratchet teeth.

10. The combination of a brake band having disconnected ends, ratchet teeth connected with one of said ends, and a spring pressed pawl pivotally connected with the adjacent end and extending in bridging relation across the ends of the band to engage the ratchet teeth and automatically adjust the band.

In testimony whereof I affix my signature.

EVERETT R. SLAGLE.